United States Patent [19]
Neefe

[11] Patent Number: 4,865,439
[45] Date of Patent: Sep. 12, 1989

[54] PRODUCTION OF COSMETIC LENSES

[75] Inventor: Charles W. Neefe, Big Spring, Tex.

[73] Assignee: Sunsoft Corp., Albuerque, N. Mex.

[21] Appl. No.: 246,204

[22] Filed: Sep. 19, 1988

Related U.S. Application Data

[63] Continuation of Ser. No. 147,148, Jan. 22, 1988, abandoned, which is a continuation-in-part of Ser. No. 869,583, Jun. 2, 1986, Pat. No. 4,738,520, which is a continuation-in-part of Ser. No. 832,381, Feb. 24, 1986, abandoned.

[51] Int. Cl.⁴ .................. B29D 11/00; G02C 7/04
[52] U.S. Cl. ................................ 351/162; 8/507
[58] Field of Search .............. 351/162, 160 R, 160 H; 8/507

[56]  References Cited
U.S. PATENT DOCUMENTS 3,476,499 11/1969 Wichterle .............. 351/162
3,557,261 1/1971 Wichterle .............. 351/162
4,460,523 7/1984 Neefe .................. 351/162

*Primary Examiner*—Bruce Y. Arnold
*Assistant Examiner*—Terry S. Callaghan

[57]  ABSTRACT

The invention is a method of making a cosmetic contact lens that changes the apparent color of the eye. This is accomplished by the following steps. The convex lens surface is expanded and distorted by a swelling agent. The swelling agent increases the pore size allowing the precipitating solution to move deeper into the convex lens surface. The precipitating solution is reacted to form an insoluble light reflecting iris pattern layer. The iris area of the convex lens surface is dyed the desired transparent color. When the lens is placed on the eye, the opaque light reflecting layer is viewed through the transparent dyed surface layer changing the apparent color of the eye.

20 Claims, 2 Drawing Sheets

PRODUCTION OF COSMETIC LENSES

This is a continuation in part of application Ser. No. 147,148 filed Jan. 22, 1988 by Charles W. Neefe entitled "DYED EYE COLOR CHANGE CONTACT LENS" now abandoned.

Which this is a continuation in part of application Ser. No. 869,583 now U.S. Pat. No. 4,738,520 entitled "AN EYE COLOR CHANGE CONTACT LENS" filed 06/02/86 which is a continuation in part of application Ser. No. 832,381 now abandoned, entitled "EYE COLOR CHANGE CONTACT LENS BLANK" filed 02/24/86 by Charles W. Neefe.

The desire to change and enhance the apparent color of the eye was recorded by the Egyptian five thousand years ago. Cosmetic makeup for the eye area accounts for the larger percentage of the cosmetic sales today.

It is well known that a transparent colored contact lens will not change the color of a dark brown eye.

Several contact lenses have been produced in an effort to achieve cosmetic eye color change of a dark eye.

One attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge. (U.S. Pat. No. 3,454,332 - Siegel).

A third generation of colored lenses provided a thin layer of colored opaque markings placed in a clear material. The opaque colored markings radiated from the center of the clear material in a geometric pattern.

PRIOR ART

Fuhrman U.S. Pat. No. 4,558,931 discloses a cosmetic lens blank having horizontal colored layers through which a contact lens is cut from the blank.

Wichterle U.S. Pat. No. 3,679,504 discloses a method of painting colored patterns between two hydrogel layers.

Spivack U.S. Pat. No. 3,536,386 discloses iris patterns sanwiched between two lens members.

Borowsky U.S. Pat. No. 4,576,453 discloses a contact lens having a gradient colored central area.

Negle U.S. Pat. No. 3,034,403 discloses a contact lens having an opaque central area.

Kai C. Su U.S. Pat. No. 4,553,975 discloses the use of reactive dyes to color transparent contact lenses.

Knapp U.S. Pat. No. 4,582,402 discloses a method of color contact lenses having an iris pattern formed by intermittent opaque markings.

(Neefe) U.S. Pat. Nos. 4,460,523 and 4,472,327 describe methods of making cosmetic contact lenses wherein the lens segments are joined vertically through the lens.

IN THE DRAWINGS

THE DYED COLOR CHANGE CONTACT LENS FUNCTIONS AS FOLLOWS

A soft hydrophilic contact lens made of lathing, molding or spin casting and is dyed the desired color in an iris area. The lens at this point will not lighten or provide a color change when placed on a dark eye. In order to provide color change qualities, barium sulfate is precipitated within the lens matrix making the colored lens iris area opaque. When the lens is placed on the eye the opaque colored iris area will change the apparent color of the eye. The central pupil area and the peripheral lens area are transparent. The peripheral area is clear and colorless; the pupil area is transparent and may be clear or colored.

SUMMARY OF THE INVENTION

The invention comprises a corneal contact lens comprising a transparent pupil section, and a colored iris section surrounding the pupil section, and a opaque or semi-opaque pattern deposited over the iris section, thereby providing a lens capable of changing the apparent color of the iris of a person wearing the lens. The colored pattern should be undiscernable to the ordinary viewer at a distance of two feet or greater.

THE COSMETIC LENS IS MADE AS FOLLOWS

Figure 1:
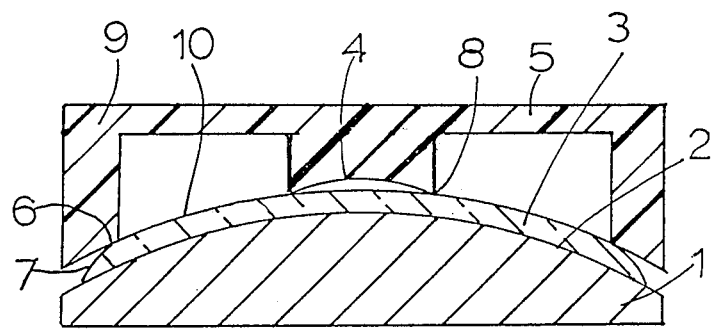
FIG. 1 shows the lens support in section, convex lens surface up.
Figure 2:
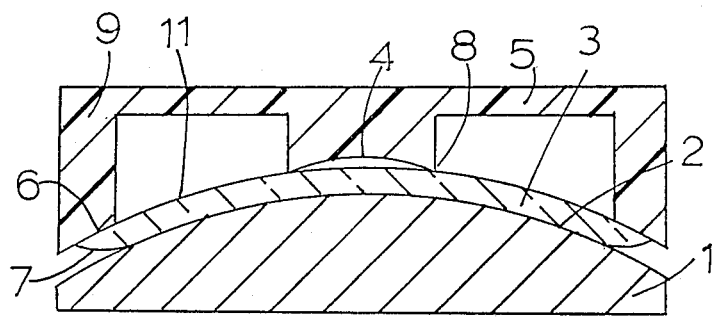
FIG. 2 shows the lens support in section, concave surface up.

The lens 3 as shown in FIG. 1 is placed on the convex surface 2 of the lens support 1. The dye mark 9 is fitted over the convex surface 10. The pupil mask 8 as shown in FIGS. 1 and 2 has a concave radius 4 which is shorter than convex lens radius. The peripheral zone mask 6 provides the clear peripheral lens zone. The assembled dye device is placed in the dye solution and the dye is allowed to combine with the lens material in the convex iris area 10 which is not protected by the mark segments 6 and 4. The convex lens surface 10 is exposed to the dye and absorbs the color on the convex lens surface 10.

EXAMPLE OF USABLE DYES

The color additives are formed by reacting one or more reactive dyes with poly (hydroxyethl methacrylate), so that the sulfate group of the dye is replaced by an ether linkage to the poly (hydroxyethyl methacrylate).

(1) Reactive Black 5 [2,7-naptha-lenedisulfonic acid, 4-amino-5-hydroxy-3,6-bis((4-((2-(sulfooxy)ethyl)sulfonyl)phenyl)azo)-tetrasodium salt] (CAS Reg. No. 17095-24-8);

(2) Reactive Blue 21 [copper, (29H,31H-phtalocyaninato(2-)-$N^{29},N^{30},N^{31},N^{32}$)-, sulfo((4-((2-sulfooxy)ethyl)sulfonyl)phenyl)amino)sulfonyl derivs] (CAS Reg. No. 73049-92-0);

(3) Reactive Orange 78 [2-napththa-lenesulfonic acid, 7-(acetylamino)-4-hydroxy-3((4-((2-(sulfooxy)ethyl)sulfonyl)phenyl)azo)-] (CAS Reg. No. 68189-39-9);

(4) Reactive Yellow 15 [benzensulfonic acid, 4-(4,5-dihydro-4-((2-methoxy-5-methyl-4-((2-(sulfooxy)ethyl)sulfonyl)phenyl)azo)-3-methyl-5-oxo-1H-pyrazol-1-yl)-] (CAS Reg. No. 60958-41-0); and (5) Reactive Blue No. 19 [2-anthracene-sulfonic acid, 1-amino-9,10-dihydro-9,10-dioxo-4-((3-((2-(sulfooxy)ethyl)sulfonyl)phenyl)amino)-, disodium salt] (CAS Reg. No. 2580-78-1).

As part of the manufacturing process, the lenses containing the color additives are thoroughly washed to remove unbound reactive dyes.

These are examples only as other dyes can be used with equal results.

Some examples of these dyes, taken from the Color Index, Volume 5, Third Edition include:

| Commercial Name | | C.I. Generic Name |
|---|---|---|
| Brilliant Blue B | HOE | C.I. Reactive Blue 27 |
| Brilliant Violet 4R | HOE | C.I. Reactive Violet 27 |
| Turquoise FC3A | HST | C.I. Reactive Blue 91 |
| Brilliant Green 3GL | FBy | C.I. Reactive Green 9 |
| Brilliant Green 1B | FBy | C.I. Reactive Green 2 |
| Brown 5RL | BAY | C.I. Reactive Brown 4 |
| Dark Brown P-BRA | BAY | C.I. Reactive Brown 24 |
| Red Violet E-2BL | BAY | C.I. Reactive Violet 7 |
| Orange G | CFM | C.I. Reactive Orange 32 |
| Red B | CGY | C.I. Reactive Red 65 |
| Violet 3B | CGY | C.I. Reactive Violet 34 |
| Yellow 6G | CGY | C.I. Reactive Yellow 126 |

In general, the formation of a covalent bond between the lens material and the reactive dyestuff is effected by contacting of the dyestuff formulation with the lens material until reaction is complete. ADDING OPAQUE WHITE TO THE CONCAVE LENS SURFACE:

The colored soft lens is inverted by pressing the convex lens surface causing it to become the concave lens surface. The inverted lens 3 as shown in FIG. 2 is placed on the convex lens support 1. The tapered lens edge 7 as shown in FIG. 1 is now inverted, having the taper adjacent to the convex lens support 1.

Figure 3:
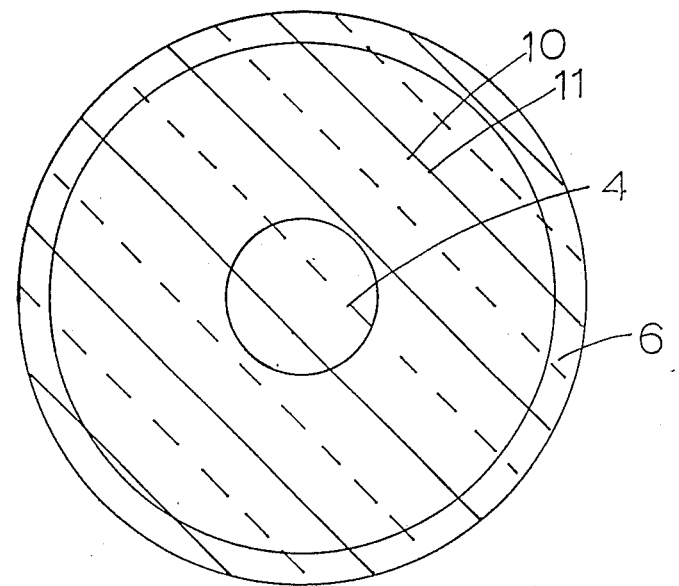
FIG. 3 shows the finished cosmetic lens from the front.
Figure 4:
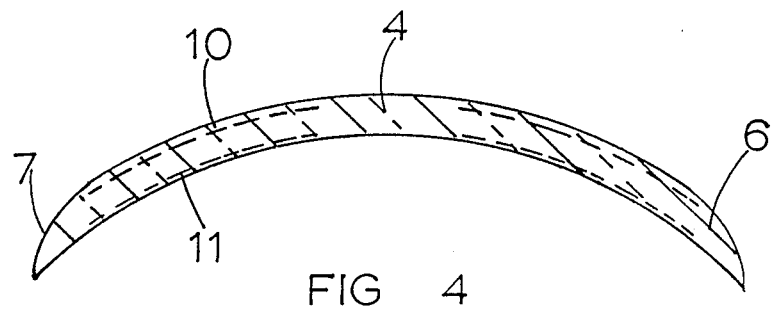
FIG. 4 shows the finished cosmetic lens in section.

The lens and the dye mask is placed in a solution of 2% to 20% barium chloride and water by weight, a small amount (0.3% to 1.0% by weight) sodium bicarbonate may be added to the barium chloride solution as a buffer. The inverted lens in the dye mask is placed in the barium chloride solution and the barium chloride is allowed to penetrate into the iris segment of the inverted lens. The lens and dye mask is removed from the barium chloride solution and placed in diluted sulphuric acid solution of from 0.02% to 10.0% concentrated sulphuric acid by weight. The sulphuric acid is allowed to react with the soluble barium chloride to form insoluble white barium sulfate. Barium sulfate renders the iris area opaque white. The lens is washed to remove all unreacted chemicals and placed on a dark brown eye. The dark brown eye will now appear a color determined by the color of the dye used in step one. FIG. 3 shows the finished lens 11 from the front having an opaque iris area 10, a clear peripheral area 6 and transparent pupil area 4. A colored transparent pupil can be provided by adding the colored dye to the iris area 10 and the pupil area 4 and adding the barium sulfate to the iris area 10 only. FIG. 4 shows the finished lens in section. The transparent colored iris area on the convex lens surface 10 surrounding the pupil area 4 and a clear peripheral area 6. The edge taper 7 indicates the lens is not inverted. The white barium sulfate is on the concave surface 11. Light entering the lens passes through the colored iris area surface 10 and is reflected by the white opaque surface 11 and passes through the transparent colored area 10 a second time upon leaving the lens. The iris area will have the apparent color of the transparent color present on the convex lens surface through which the white opaque concave surface is seen.

For economic reasons, it is preferable to treat the polymerized material with the dyestuff preparation. However, it would also be possible to treat a monomer with dyes prior to polymerization, and to polymerize the dyestuff-monomer mixture.

Some of the opaque compounds which may be used to practice the invention are Zink Oxide, Tin Oxide, Titanium Dioxide and Barium Sulphate.

Figure 5:
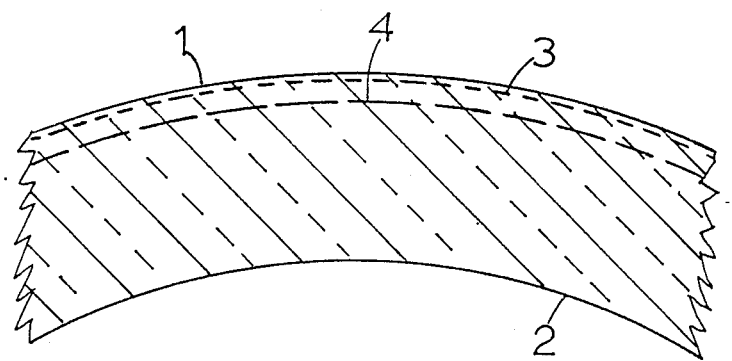
FIG. 5 shows a segment of the lens enlarged in section.

Another method of providing a cosmetic lens to change the apparent eye color may be made by the following method. The lens is placed in the dye fixture as shown in FIG. 1. Both the dye color and the opaque material are on the convex lens surface 1 as shown in FIG. 5. The dye color is allowed to penetrate only a small distance into the convex lens surface 3, a distance of from 0.0001 to 0.005 of a millimeter has been used. The opaque material 4 is allowed to penetrate deeper into the convex lens surface 1, a distance from 0.002 to 0.05 of a millimeter has been used. The opaque material 4 is placed behind the transparent colored surface layer by placing it further from the convex lens surface 1 and deeper within the lens structure. An apparent eye color change is provided as the light colored, light reflecting layer 4 is seen through the transparent colored surface layer 3. The concave lens surface 2 is not colored. In order to place the light reflecting layer deeper in the lens, a swelling agent is added to the solution to be precipitated. Swelling agents cause the pores of the hydrogel lens to become engorged allowing the precipitating solution to penetrate deeper into the lens structure 4 and below the surface dye layer 3.

Examples of useful super swelling agents are:
Ethyl Alcohol
Urea
Butanol
Methanol
Methyl Sulfoxide
Dimethyl Formamide The swelling agents are used in the precipitating solution in amounts ranging from 0.5% to 50% by weight.

The lenses are stored in the gel state in a normal saline solution (0.9% sodium chloride). The super swelling agents cause the lens surface to swell greatly enlarging the surface pores thus allowing the precipitating solution to move into the lens behind the dyed surface layer.

It is understood that the order of the steps recited may be changed and other useful results obtained.

EXAMPLES (1) The swelling agent and the opaque precipitating solution may be applied first and the dye solution added second. In this example the dye may adhere to the surface of the precipitated particles making a colored opaque precipitant.

(2) The precipitating, swelling solution is applied to the convex lens surface followed by a dye solution with no swelling agent followed by a second precipitating and swelling solution. In this example part of the precipitated particles are dyed and part remain white.

(3) The dye is applied to the convex lens surface and the swelling and precipitating solution is applied to the concave lens surface.

(4) A swelling and precipitating solution is applied first followed by a selected dye color resulting in a dyed precipitant of the selected color, a second precipitating solution is applied followed by a selected dye of a different color providing precipitants of two different colors.

(5) The localized swelling provided by the swelling agents results in a distortion of the lens surface contour in the area being expanded. This distortion results in the formation of an iris pattern due to uneven adsorption of the precipitating solution in the distorted iris area.

An additional advantage of the inventive lenses is the fact that many of the dyestuffs and other additives used for tinting the lens tend to absorb ultraviolet, visible and infared radiation, particularly of the wave-lengths shown to be harmful to the eye.

It is understood that the invention is not limited to the exact details of construction shown and described herein for obvious modifications will occur to persons skilled in the art.

I claim:

1. A method of making a cosmetic soft contact lens that changes the apparent color of the eye having a transparent colored convex surface layer and an internal light reflecting layer made by the steps of providing a soft hydrogel contact lens, exposing the convex lens surface to a swelling agent that expands the convex lens surface, allowing a precipitating solution to penetrate into the convex lens surface, reacting the precipitating solution to form an insoluable light reflecting precipitant within the hydrogel, rinsing and removing the precipitating and swelling solution from the lens, dyeing the convex lens surface a transparent color.

2. A method as in claim 1 wherein barium sulfate is precipitated.

3. A method as in claim 1 wherein the swelling agent is ethyl alcohol.

4. A method as in claim 1 wherein the swelling agent is urea.

5. A method as in claim 1 wherein the pupil area of the lens is a transparent color.

6. A method as in claim 1 wherein the precipitant is opaque and is dyed a selected color.

7. A method as in claim 1 wherein the swelling agent is methyl sulfoxide.

8. A method of making a cosmetic hydrogel contact lens that alters the apparent color of the eye upon which it is placed by the steps of providing a hydrogel contact lens, applying a precipitating solution containing a swelling agent to the iris area of the convex lens surface, allowing the precipitating solution to swell and distort the curvature of the iris area of the convex lens surface and penetrate into the iris area of the convex lens surface, reacting the precipitating solution to form an iris pattern of insoluble precipitant, dyeing the convex lens surface a transparent color.

9. A method as in claim 8 wherein barium sulfate is precipitated.

10. A method as in claim 8 wherein the swelling agent is ethyl alcohol.

11. A method as in claim 8 wherein the swelling agent is urea.

12. A method as in claim 8 wherein the pupil area of the lens is a transparent color.

13. A method as in claim 8 wherein the precipitant is opaque and is dyed a selected color.

14. A method of making a soft cosmetic contact lens that changes the apparent color of the eye by the steps of, providing a soft contact lens, applying a precipitating solution containing a swelling agent to the iris area of the convex lens surface, allowing the swelling agent to expand and penetrate into the convex lens surface, reacting the precipitating solution to form an insoluble light reflecting precipitant within the convex side of the lens, dyeing the convex lens surface a selected transparent color, placing the lens in the precipitating and swelling solution a second time, allowing the swelling solution to swell and expand the iris area of the lens a second time, reacting the precipitating solution to form additional insoluble light reflecting precipitant within the lens iris area.

15. A method as in claim 14 wherein barium sulfate is precipitated.

16. A method as in claim 14 wherein the sweling agent is ethyl alcohol.

17. A method as in claim 14 wherein the swelling agent is urea.

18. A method as in claim 14 wherein the pupil area of the lens is a transparent color.

19. A method as in claim 14 wherein the precipitant is opaque and is dyed a selected color.

20. A method as in claim 14 wherein the swelling agent is methyl sulfoxide.

* * * * *